UNITED STATES PATENT OFFICE.

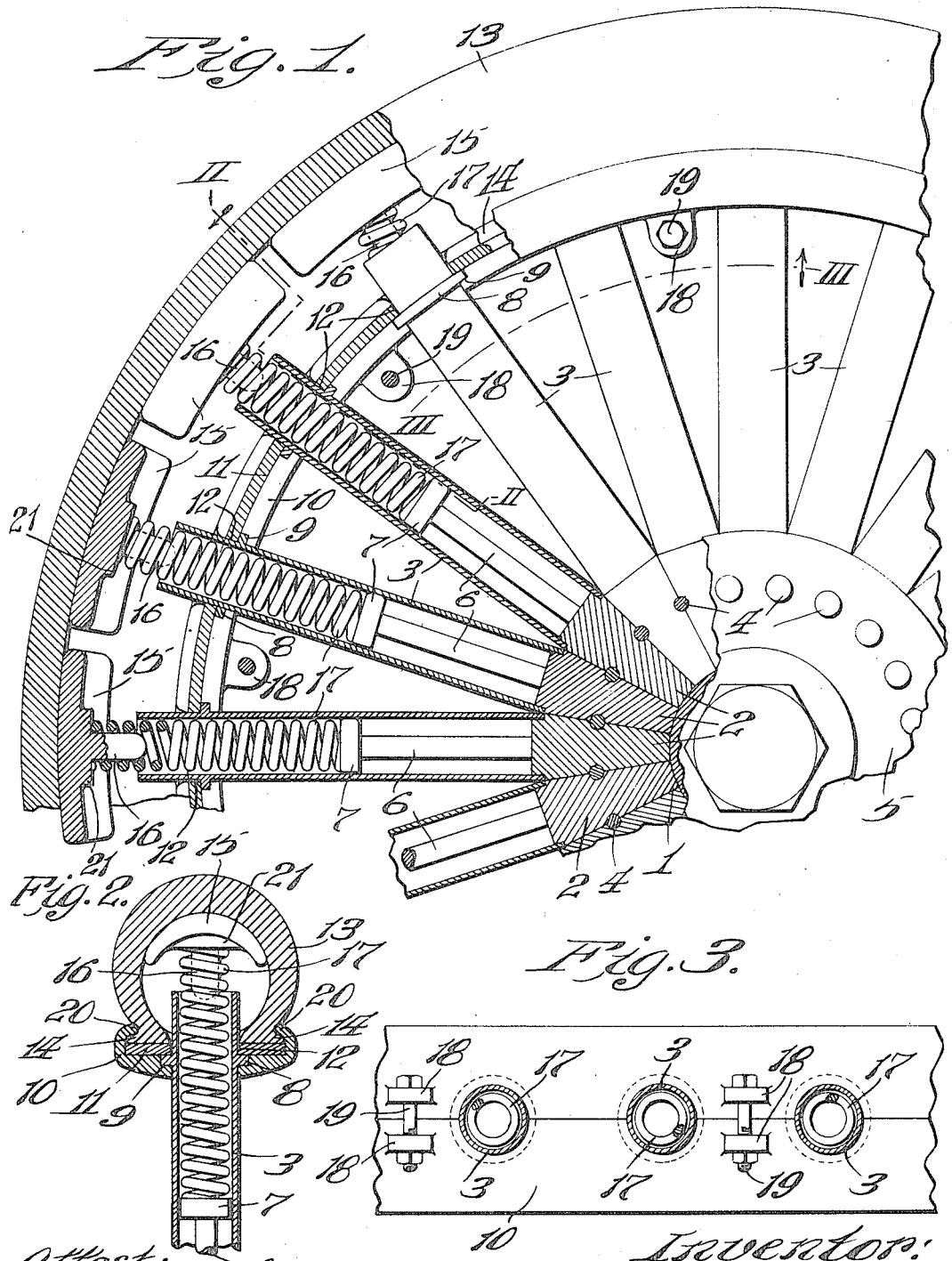

EMANUEL S. MORRIS, OF ST. LOUIS, MISSOURI.

RESILIENT VEHICLE-WHEEL.

1,141,255.  Specification of Letters Patent.  Patented June 1, 1915.

Application filed December 11, 1913. Serial No. 805,901.

*To all whom it may concern:*

Be it known that I, EMANUEL S. MORRIS, a citizen of the United States of America, and a resident of the city of St. Louis and State of Missouri, have invented certain new and useful Improvements in Resilient Vehicle-Wheels, of which the following is a specification.

The object of this invention is to provide a wheel of improved construction having a flexible tire which will be strong and durable, and simple of manufacture, and from its outer appearance will look like a wheel that is provided with a pneumatic tire, the resiliency of the wheel being obtained by a series of radially arranged helical springs bearing against the inner periphery of the tire.

Other and further objects will appear in the specification, and be specifically pointed out in the appended claims, reference being had to the accompanying drawings exemplifying the invention, and in which, Figure 1 is a side elevation of a portion of this improved wheel, partly shown in section. Fig. 2 is a transverse section taken on the line II—II, Fig. 1. Fig. 3 is an inverted view of a portion of the under side of the channel of this improved wheel taken on the line III—III, Fig. 1, parts being shown in section.

Referring to the drawings: 1 designates the hub of a wheel, said hub being constructed by having the wedge-shaped portions 2 of the tubular spokes 3 secured together by the bolts 4 passing through and between the wedge-shaped portions of the spokes and the side flanges 5 of the wheel. These wedge-shaped portions 2 are secured to the inner ends of the spokes in any suitable manner.

Loosely mounted in each of said spokes 3 is a filler rod 6, the inner ends of said filler rods adapted to be seated on the portions 2, the outer ends of said rods having secured thereto the spring seats 7. Formed on each of said spokes 3 adjacent the outer end, is an annular shoulder 8, each of said shoulders being mounted in a countersink 9 formed in the channel 10.

Seated in the channel 10 is an annulus 11, said annulus having circular openings 12 radially formed in the periphery thereof.

Removably mounted in the channel 10 is a flexible casing 13, said casing having the ordinary channel securing lugs 14. Mounted in said casing and adapted to bear against the inner periphery thereof are a series of bearing shoes 15, each of said shoes having a lug 16 formed thereon. Mounted in said spokes 3 are a series of helical springs 17, one end of each of said springs adapted to bear on the spring seats 7, and the opposite ends adapted to bear against the shoes 15 and over the lugs 16. This channel 10 is constructed of two parts, each of said parts having lugs 18 formed thereon, the lugs of each part being disposed oppositely to each other so that they are arranged in pairs, there being a bolt 19 passing through each pair of lugs.

In the construction of this improved wheel, the outer ends of the spokes 3 are inserted in the openings 12 of the annulus 11 until the shoulders 8 bear against the under side of said annulus. The filler rods 6 are then placed inside of the tubular spokes, and the helical springs 17 are mounted in said spokes and seated on the spring seats 7 of the filler rods 6. The shoes 15 are then placed in the casing 13, and the outer ends of the springs 17 are introduced over the lugs 16 of said shoes. The sections of the channel 10 are then mounted together, and the clenching portions 20 of said channel are engaged over the lugs 14 of the casing, care of course being taken that the shoulders 8 of the spokes 3 will seat in the countersinks 9. The bolts 19 are then manipulated, and the parts of the channel 10 are drawn together thus securely holding the casing 13, annulus 11 and spokes 3 in their respective places.

It is now readily seen how resiliency will be given to the wheel by this improved construction as pressure is brought to bear against the outer periphery of the casing 13 and the shoes 15. If a vehicle equipped with this wheel has too much of a load and the tension of the springs cannot raise the weight, the outer ends of the spokes 3 will bear against the shoulders 21 which are formed on the inner face of the shoes 15, thereby relieving any damaging effects to the springs by reason of too much compression strain on them.

What I claim is:

1. A vehicle wheel comprising a flexible casing, shoes mounted in said casing, a channel for said casing, an annulus mounted in said channel, a series of tubular spokes having their outer ends mounted in said annulus, means mounted in said spokes for resiliently holding said shoes against said casing, said channel providing means for clamping said casing, annulus and spokes together.

2. A vehicle wheel comprising a flexible casing, shoes mounted in said casing, an annulus engaging said casing, a series of tubular spokes having their inner ends mounted in said annulus, a shoulder formed on each of said spokes, said shoulders adapted to bear against said annulus, means mounted in said spokes for resiliently holding said shoes against said casing, and a channel for clamping said casing, annulus, and spokes together, said channel adapted to bear against one side of said shoulders of said spokes.

3. A vehicle wheel comprising a hollow flexible tire, a series of radially arranged shoes mounted in said tire and adapted to bear against the inner periphery thereof, a lug formed on each of said shoes, a channel for said tire, a series of radially arranged tubular spokes engaging said channel, a shoulder formed adjacent one end of each of said spokes, said shoulders adapted to bear on the outer periphery of said channel, an annulus mounted in said channel over said shoulders of said spokes, a helical spring mounted in each of said spokes, each of said springs engaging each of said lugs of said shoes, said springs adapted to bear outwardly against said shoes, said channel adapted to clamp said casing, annulus and spokes together.

4. A vehicle wheel comprising a flexible casing, shoes mounted in said casing, a channel for said casing, said channel comprising a pair of circular sections, semi-circular openings formed in the adjacent edges of said sections, said semicircular openings of said sections being oppositely disposed, an annulus mounted in said channel, a series of tubular spokes having their outer ends mounted in said semicircular openings of said sections, means mounted in said spokes for resiliently holding said shoes against said casing, said channel providing means for clamping said casing, annulus and spokes together, and means for clamping said sections of said channel.

5. A vehicle wheel comprising a flexible casing, shoes mounted in said casing, an annulus engaging said casing, a series of tubular spokes having their outer ends mounted in said annulus, a filler rod mounted in each of said spokes, a shoulder formed on each of said spokes, said shoulders adapted to bear against said annulus, springs mounted in said spokes adapted to bear against said shoes and said filler rods, and a channel for clamping said casing, annulus and spokes together, said channel adapted to bear against one side of said shoulders of said spokes.

6. A vehicle wheel comprising a flexible casing, shoes mounted in said casing, a lug formed on each of said shoes, a channel for said casing, an annulus mounted in said channel, radially arranged openings formed in said annulus and said channel, a series of tubular spokes having their outer ends mounted in said openings of said annulus and said channel, a shoulder formed on each of said spokes, said shoulders of said spokes being mounted between said annulus and said channel, a filler rod mounted in each of said spokes, and springs mounted in said spokes adapted to engage said lugs of said shoes and said filler rods, said channel adapted to clamp said casing, annulus and spokes together.

EMANUEL S. MORRIS.

In the presence of—
M. C. HAMMON,
H. G. FLETCHER.